United States Patent
Fujikawa

(10) Patent No.: US 6,805,211 B2
(45) Date of Patent: Oct. 19, 2004

(54) PARALLEL HYBRID VEHICLE

(75) Inventor: Masato Fujikawa, Shizuoka (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/251,799

(22) Filed: Sep. 23, 2002

(65) Prior Publication Data

US 2003/0062206 A1 Apr. 3, 2003

(30) Foreign Application Priority Data

Sep. 28, 2001 (JP) ........................................ 2001-303926

(51) Int. Cl.$^7$ ............................................... B60K 6/06
(52) U.S. Cl. ........................ 180/65.2; 180/65.3; 477/5; 701/22
(58) Field of Search ............................... 180/65.1, 65.2, 180/65.3, 65.4; 477/5, 6, 70, 22

(56) References Cited

U.S. PATENT DOCUMENTS

| | | | | |
|---|---|---|---|---|
| 5,771,478 A | | 6/1998 | Tsukamoto et al. | |
| 5,846,155 A | * | 12/1998 | Taniguchi et al. | ............. 477/2 |
| 5,895,333 A | | 4/1999 | Morisawa et al. | |
| 5,982,045 A | * | 11/1999 | Tabata et al. | ................. 290/17 |
| 6,054,776 A | | 4/2000 | Sumi | |
| 6,081,042 A | * | 6/2000 | Tabata et al. | ................. 290/45 |
| 6,083,138 A | * | 7/2000 | Aoyama et al. | ................ 477/5 |
| 6,155,954 A | * | 12/2000 | Itoyama et al. | ................ 477/5 |
| 6,183,389 B1 | * | 2/2001 | Tabata | ............................ 477/5 |
| 6,203,468 B1 | * | 3/2001 | Nitta et al. | ..................... 477/5 |
| 6,209,672 B1 | * | 4/2001 | Severinsky | ................ 180/65.2 |
| 6,296,593 B1 | * | 10/2001 | Gotou et al. | ................ 477/176 |
| 6,362,580 B1 | * | 3/2002 | Omata et al. | ................ 318/139 |
| 6,428,444 B1 | * | 8/2002 | Tabata | ............................ 477/3 |
| 6,441,506 B2 | * | 8/2002 | Nakashima | ............... 290/40 C |
| 6,563,230 B2 | * | 5/2003 | Nada | ........................ 290/40 C |
| 6,637,530 B1 | * | 10/2003 | Endo et al. | ................ 180/65.2 |
| 2003/0029653 A1 | * | 2/2003 | Fujikawa | ................... 180/65.2 |

FOREIGN PATENT DOCUMENTS

| | | |
|---|---|---|
| JP | 8-135762 | 5/1996 |
| JP | 9-21460 | 1/1997 |
| JP | 9-109705 | 4/1997 |
| JP | 10-304513 | 11/1998 |

OTHER PUBLICATIONS

U.S. patent application Ser. No. 10/213,064, Fujikawa, filed Aug. 7, 2002.

* cited by examiner

*Primary Examiner*—Christopher P. Ellis
*Assistant Examiner*—Jeffrey Restifo
(74) *Attorney, Agent, or Firm*—Foley & Lardner LLP

(57) ABSTRACT

In a parallel hybrid vehicle, an revolution speed of an engine, a revolution speed of a motor/generator, and a regenerative power obtained by the motor/generator are calculated under both of released and clutched states of a lock-up clutch for each gear speed range achievable by a transmission on the basis of an estimated requested vehicular deceleration state and a driving state related to one of the gear speed ranges of the transmission and an operation state of the clutch is selected on the basis of the engine speed of the engine, the revolution speed of the motor/generator, and a regenerative power obtained by the motor/generator calculated as described above in such a manner that as a charge state of the charge device becomes smaller, the regenerative power obtained by means of the motor/generator becomes larger.

15 Claims, 13 Drawing Sheets

ENGINE  OUTPUT  MOTOR/
                GENERATOR

ENGINE  OUTPUT  MOTOR/
                GENERATOR

( REGENERATIVE POWER, TORQUE, AND REVOLUTION VELOCITY CALCULATING SUBROUTINE START )

↓ S51

CALCULATE ENGINE SPEED, MOTOR/GENERATOR REVOLUTION SPEED, ENGINE TORQUE, MOTOR/GENERATOR TORQUE, AND REGENERATIVE POWER FOR EACH TRANSMISSION GEAR RANGE UNDER A LOCK-UP CLUTCH ENGAGED STATE

↓ S52

CALCULATE ENGINE SPEED, MOTOR/GENERATOR REVOLUTION SPEED, ENGINE TORQUE, MOTOR/GENERATOR TORQUE, AND REGENERATIVE POWER FOR EACH TRANSMISSION GEAR RANGE UNDER A LOCK-UP CLUTCH RELEASED STATE

↓

( RETURN )

PARALLEL HYBRID VEHICLE

BACKGROUND OF THE INVENTION

1. Field of the Invention

The present invention relates to a parallel hybrid (electric) vehicle having an engine and a motor/generator (a motor serving also as a generator), an output torque of either one or both of these engine and motor/generator being transmitted to a transmission via a torque synthesis mechanism so that a vehicular running driving force is obtained from either one or both of the engine and motor/generator.

2. Description of the Related Art

A U.S. Pat. No. 6,054,776 issued on Apr. 25, 2000 (which corresponds to a Japanese Patent Application First Publication No. Heisei 10-304513 published on Nov. 12, 1998) exemplifies a previously proposed parallel hybrid vehicle, In the previously proposed parallel hybrid vehicle, the torque synthesis mechanism constituted by a differential gear mechanism (planetary gear mechanism) is used to synthesize output torques of the engine and the motor/generator and the synthesized output torque thereat is transmitted via the transmission to driven wheels of the vehicle. A method of starting the parallel hybrid vehicle disclosed in the above-described United States patent is such as to develop a torque from the motor/generator in such a manner that a revolution speed of the motor/generator is made completely or substantially coincident with the revolution speed of the engine while arise in the revolution speed of the engine (also called, engine speed) is suppressed. When the revolution speed of the motor/generator is made completely coincident with or made substantially coincident with the engine speed, a lock-up clutch directly couples the engine and the motor/generator without any interruption. Thereafter, unless a vehicle velocity is reduced, the vehicular driving force from only the engine or from a combination of the engine and the motor/generator is developed.

SUMMARY OF THE INVENTION

In the previously proposed parallel hybrid vehicle described above, a regenerative electrical power can be obtained by a regenerative operation for the motor/generator. This regenerative power is changed within a charge device so as to serve as an energy when the motor/generator is used as the motor. In addition, when the motor/generator is in the regenerative operation, a kinetic energy of the vehicle is converted into the regenerative power. Hence, a regenerative driving force is acted upon motor driven wheels drive by the motor/generator. Each of Japanese Patent Application First Publications No. Heisei 8-135762 published on May 31, 1996 (which corresponds to a U.S. Pat. No. 5,771,478 issued on Jun. 23, 1998) and No. Heisei 9-109705 published on Apr. 28, 1997 (which corresponds to a U.S. Pat. No. 5,895,333 issued on Apr. 20, 1999) exemplifies a previously proposed hybrid vehicle drive system with a power regeneration of the motor/generator. In the former Japanese Patent Application First Publication (JP8-135762), a power regenerative drive is carried out with the lock-up clutch maintained at the clutched state until a revolution speed of a carrier of the differential gear mechanism connected to the transmission becomes equal to or lower than a predetermined speed. Hence, since, in an ordinary running region, the motor/generator and the engine are rotated and synthesized together, the kinetic energy of the vehicle consumed in the engine is large during the vehicular deceleration and a sufficient regenerative power cannot be obtained. On the other hand, in the latter Japanese Patent Application First Publication (JP9-109705), a discrete clutch between the carrier of the differential gear mechanism connected to the transmission and the engine is disposed. During the vehicular deceleration, this clutch is released for the engine to be separated so that the energy consumed by the engine is substantially zeroed to improve the regenerative power and a fuel economy can be improved by stopping the separated engine and stopping the supply of the fuel. However, since, in the hybrid vehicle in the latter case, two clutches are needed so that the increase in the number of parts, a mountability (or mounting easiness) on the vehicle, and cost performance become disadvantageous. In addition, when the engine which is stopped is re-started, a complicated control such as a clutch engagement becomes necessary.

It is, hence, an object of the present invention to provide a parallel hybrid vehicle which can obtain a sufficient regenerative power without need of a clutch which cuts off a power between the engine and the differential gear mechanism.

The above-described object can be achieved by providing a hybrid vehicle, comprising: an engine; a charge device; a transmission; a motor/generator having both functions of an electric motor and a generator and carrying out supply and receipt of an electric current to and from the charge device; a differential unit having a first axle connected to an output axle of the engine, a second axle connected to an output axle of the transmission, and a third axle connected to an input axle of the transmission; a clutch interposed between any two of the first, second, and third axles of the differential unit to be engaged when a difference in revolution speed between an engine speed of the engine and a revolution speed of the motor/generator becomes equal to or lower than a predetermined value during a start of the vehicle; and a controlling section that enables controls of an optimum state of the clutch, driving states of the motor/generator and the engine, and gear speed range of the transmission, the controlling section comprising: requested deceleration state estimating section that estimates a requested vehicular deceleration state on the basis of at least one of a vehicular running speed and a brake manipulated variable of a vehicular brake system; a calculating section that calculates the engine speed of the engine, the revolution speed of the motor/generator, and a regenerative power obtained by the motor/generator under both of released and clutched states of the clutch for each gear speed range achievable by the transmission on the basis of the requested vehicular deceleration state estimated by the requested deceleration state estimating section; and an optimum driving state selecting section that selects one of the gear speed ranges of the transmission and the operation state of the clutch on the basis of the engine speed of the engine, the revolution speed of the motor/generator, and the regenerative power obtained by the motor/generator calculated by the calculating section in such a manner that as a charge state of the charge device becomes smaller, the regenerative power obtained by means of the motor/generator becomes larger, the controlling section controlling the operation state of the clutch, the driving states of the engine and motor/generator, and the gear speed range of the transmission on the basis of the gear speed range of the transmission and the clutched state of the clutch related to the driving state selected by the optimum driving state selecting section.

The above-described object can also be achieved by providing a method applicable to a hybrid vehicle, the hybrid vehicle comprising: an engine; a charge device; a transmission; a motor/generator having both functions of an electric motor and a generator and carrying out supply and receipt of an electric current to and from the charge device; a differential unit having a first axle connected to an output axle of the engine, a second axle connected to an output axle of the transmission, and a third axle connected to an input axle of the transmission; a clutch interposed between any two of the first, second, and third axles of the differential unit to be engaged when a difference in revolution speed between an engine speed of the engine and a revolution speed of the motor/generator becomes equal to or lower than a predetermined value during a start of the vehicle; and a controlling section that enables controls of an optimum state of the clutch, driving states of the motor/generator and the engine, and gear speed range of the transmission, the method comprising: estimating a requested vehicular deceleration state on the basis of at least one of a vehicular running speed and a brake manipulated variable of a vehicular brake system; calculating the engine speed of the engine, the revolution speed of the motor/generator, and a regenerative power obtained by the motor/generator under both of released and clutched states of the clutch for each gear speed range achievable by the transmission on the basis of the estimated requested vehicular deceleration state; and selecting one of the gear speed ranges of the transmission and the operation state of the clutch on the basis of the engine speed of the engine, the revolution speed of the motor/generator, and the regenerative power obtained by the motor/generator calculated in such a manner that as a charge state of the charge device becomes smaller, the regenerative power obtained by means of the motor/generator becomes larger, at the controlling step, the operation state of the clutch, the driving states of the engine and motor/generator, and the gear speed range of the transmission being controlled on the basis of the gear speed range of the transmission and the clutched state of the clutch related to the selected driving state.

This summary of the invention does not necessarily describe all necessary features so that the invention may also be a sub-combination of these described features.

BRIEF DESCRIPTION OF THE DRAWINGS

FIG. 13 is a flowchart representing a minor program executed in the arithmetic processing shown in FIG. 10 in the parallel hybrid vehicle shown in FIG. 1.

DETAILED DESCRIPTION OF THE PREFERRED EMBODIMENT

Reference will hereinafter be made to the drawings in order to facilitate a better understanding of the present invention.

Figure 1:
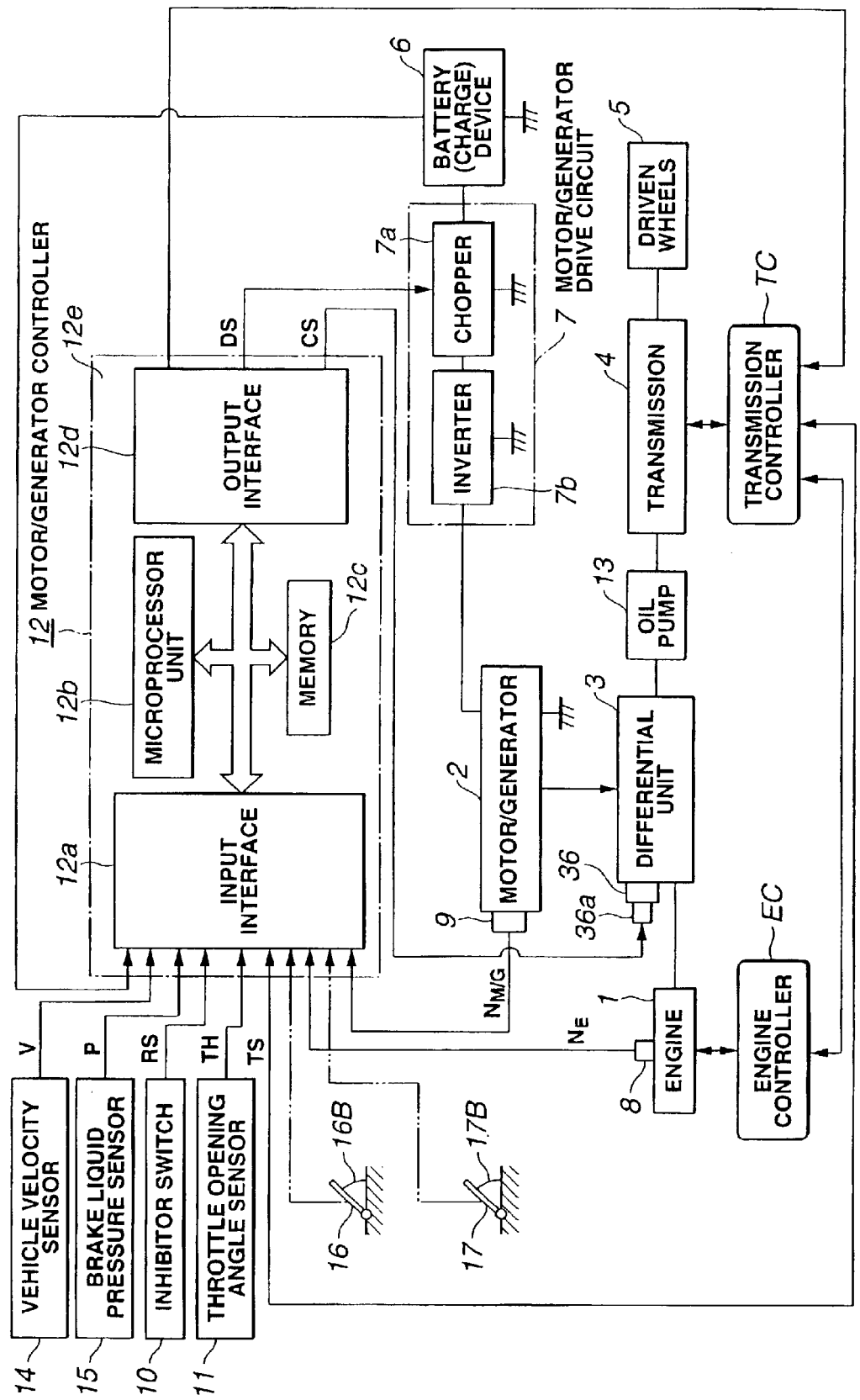
FIG. 1 is a rough configuration view of a parallel hybrid vehicle in a preferred embodiment according to the present invention.

FIG. 1 shows a rough configuration of a parallel hybrid vehicle in a preferred embodiment according to the present invention. As shown in FIG. 1, output ends of an engine 1 and an AC type motor/generator 2 constituted by a three-phase synchronous motor/generator as an electrical rotary drive source functioning as both of an electric motor and a generator are connected to input ends of a differential unit (differential gear mechanism) 3 which constitutes a torque synthesis mechanism, respectively. An output end of differential unit 3 is connected to an input end of a transmission 4 in which no such a starting device as a torque converter is mounted and an output end of transmission 4 is connected to driven wheels 5 via a final reduction gear unit (not shown). It is noted that, in this embodiment, an oil pump 13 is disposed between differential unit 3 and driven wheels 5 and a fluid pressure created by oil pump 13 is used to control transmission 4 and to clutch (engage) and release lock-up clutch of differential unit 3.

Figure 2:
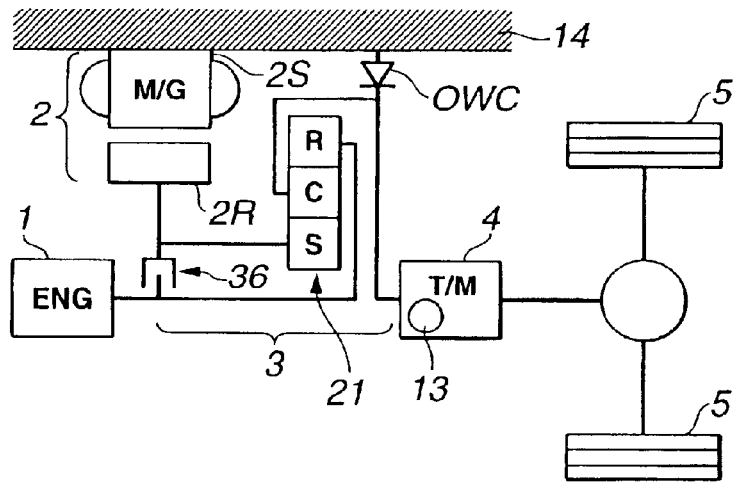
FIG. 2 is a schematic block diagram of one example of a differential unit used in the embodiment of the parallel hybrid vehicle according to the present invention.
Figure 3A:
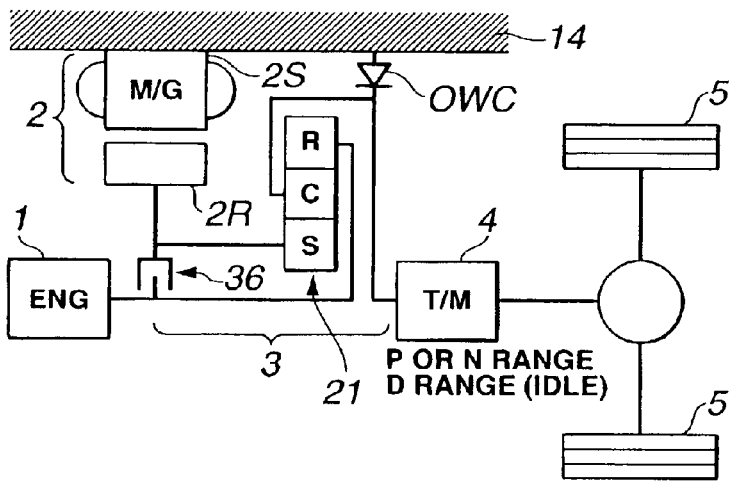
FIGS. 3A and 3B are a schematic block diagram and an alignment chart of a drive system of the parallel hybrid vehicle shown in FIG. 1 when an engine is started.
Figure 3B:
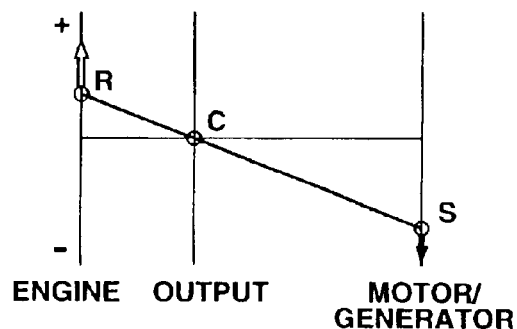

Engine 1 is controlled by means of an engine controller EC and motor/generator 2 is provided with, for example, a stator 2S and a rotor 2R, as shown in FIG. 2, and is drivingly controlled by means of a motor/generator drive circuit 7 connected to a battery device 6 constituted by a chargeable battery and/or a capacitor.

Motor/generator drive circuit 7 includes a chopper 7a connected to battery device 6 and an inverter 7b to convert a DC into a three-phase alternating current, inverter 7b being connected between chopper 7a and motor/generator 2 and having, for example, six IGBTs (Insulated Gate Bipolar Transistors). Motor/generator drive circuit 7 outputs a chopper signal having a duty ratio determined in accordance with an input of a duty control signal DS from a motor/generator controller 12 to chopper 7a. This inverter 7b forms gate control signals for respective IGBTs to form a three-phase alternating current driven with a frequency synchronized with a rotation of motor/generator 2 for motor/generator 2 to function as the motor when motor/generator 2 is positively rotated on the basis of rotary position detection signal of a position sensor to detect a rotational position of rotor 2R of motor/generator 2 (not shown) and functions as the generator when motor/generator 2 is rotated in a reverse direction.

It is noted that motor/generator 2 is used to drive the vehicle in the same way as engine 1 and a rotational direction toward which the vehicle is driven is defined as a positive rotation and a rotational direction which is reverse to the positive rotation is a reverse rotation.

In addition, differential unit 3, as shown in FIG. 2, includes a planetary gear mechanism 21 as the torque synthesis mechanism. Planetary gear mechanism 21 constitutes the torque synthesis mechanism while achieving differential functions between engine 1 and motor/generator 2. Planetary gear mechanism 21 includes: a sun gear S; a plurality of pinions P (specific structure of pinions P is not shown) meshed with an outer peripheral side of sun gear S at equal angular intervals thereof; a pinion carrier C to link with each pinion P; and a ring gear R meshed with an outside of pinion P. Ring gear R (first axle) of planetary gear mechanism 21 is connected to engine 1, sun gear S (second axle) of planetary gear mechanism 21 is connected to rotor 2R of motor/generator 2, and pinion carrier C (third axle) of planetary gear mechanism 21 is connected to the input end of transmission 4.

In addition, a lock-up clutch 36 to control linkage states of both of motor/generator 2 and engine 1 is interposed between rotor 2R of motor/generator 2 and the output end of engine 1. A one-way clutch OWC is interposed between pinion carrier C of planetary gear mechanism 21, viz., an input end of transmission 4 and a casing 14. One-way clutch OWC restricts a rotational direction of each of pinion carrier C and transmission 4 only in the positive rotational rotation and engages in the case of the reverse rotational direction to disable the reverse rotation. It is noted that although a damper may be interposed between engine 1 and ring gear R of planetary gear mechanism 21, in the embodiment, the presence of the damper can be neglected since a resonance frequency of the damper is high.

Lock-up clutch 36, for example, is constituted by a wet type multiple-plate clutch. When a control signal CS supplied to an electromagnetic solenoid 36a of an electromagnetic valve (not shown) to supply or drain a line pressure to or from a cylinder portion of lock-up clutch 36 is at a low level, lock-up clutch 36 is controlled in a disengagement state in which engine 1 and transmission 4 are separated from each other. When control signal CS is at a high level, lock-up clutch 36 is controlled in an engagement state in which engine 1 is directly coupled to transmission 4.

Furthermore, the transmission gear ratio of transmission (T/M) 4 (it is noted that this transmission is an automatic transmission disclosed in a Japanese Patent Application First Publication No. Heisei 9-021460 published on Jan. 21, 1997) is controlled, for example, at any one of gear ratios of first speed, second speed, third speed, and fourth speed determined by referring to a gear control map previously set on the basis of a vehicular velocity and an opening angle TH of an engine throttle valve by means of a transmission controller TC. Transmission 4, in this embodiment, includes an automatic transmission and an engine brake purpose clutch which is capable of transmitting a reverse driving force from driven wheels 5, so-called, a torque on a road surface reaction force from driven wheels 5 toward the torque synthesis mechanism when engaged. It is noted that transmission controller TC carries out mutual communications with engine controller EC so that necessary information is, at any time, transmitted and received mutually.

In addition, engine speed sensor 8 and motor/generator revolution speed sensor 9 are installed on engine 1 and motor/generator 2 to detect revolutions per time on their respective output shafts of engine 1 and motor/generator 2, respectively. An inhibitor switch 10 to output a range signal in accordance with a range selected by a select lever (not shown), a throttle opening angle sensor 11 to detect an opening angle of the engine throttle valve varied in accordance with a depression depth of an accelerator pedal of the vehicle, and a suspension stroke sensor 15 to detect a weight of the vehicle from a depth stroke of a suspension system of the vehicle are provided. Motor/generator controller 12 to control motor/generator 2 and lock-up clutch 36 receives detected values of the revolution speeds $N_E$ and $N_{M/G}$ of the revolution speed sensors 8 and 9, range signal RS of inhibitor switch 10, a detected value of the opening angle of throttle valve, and a detected value of a suspension stroke ST of suspension stroke sensor 15. In addition, motor/generator controller 12 carries out mutual communications with at least transmission controller TC. For example, pieces of information on the gear ratio (speed range) of transmission 4 and on the clutch/release state of engine brake purpose clutch are inputted as transmission device signals TS.

Motor/generator controller 12 is constituted by a microcomputer 12e having at least input interface (circuit) 12a, an arithmetical processing unit (microprocessor unit) 12b, a memory 12c, and an output interface (circuit) 12d.

Input interface circuit 12a receives detected value $N_E$ of engine speed of engine speed sensor 8, detected value $N_{M/G}$ of the revolution speed of motor/generator 2 of motor/generator revolution speed sensor 9, range signal RS of inhibitor switch 10, detected value TH of throttle valve opening angle from throttle valve opening angle sensor 11, a brake liquid pressure P of a brake system from a brake liquid pressure sensor 15, and a vehicle velocity V of a vehicle velocity sensor 14, and a transmission signal TS from transmission controller TC.

Arithmetic processing unit (microprocessor) 12b is activated in response to a turned on of a predetermined power supply when, for example, a key switch (not shown) is turned on. Arithmetic processing unit 12b, at first, is initialized so that a drive duty control signal MS and a power supply duty control signal GS to motor/generator 2 are turned off and clutch control signal CS to be supplied to lock-up clutch 36 is also turned off. Thereafter, when the vehicle is at least started, motor/generator 2 and lock-up clutch 36 are controlled on the basis of detected value of engine speed $N_E$, the detected value $N_{M/G}$ of the revolution speed of motor/generator 2, range signal RS, and detected value (opening angle) TH of the engine throttle valve. In details, arithmetic processing (Microprocessor unit 12b carries out an, so-called, idling stop in which engine 1 is stopped during a stop of the vehicle, in the first embodiment.

Memory 12c previously stores a processing program required for the arithmetical processing of arithmetic processing unit 12b and stores various kinds of programs required during a calculation process of arithmetic processing unit 12b. Memory 12c generally includes a RAM (Random Access Memory) and a ROM (Read Only Memory).

Output interface circuit 12d supplies drive duty control signal MS, power generation duty control signal GS, and clutch control signal GS to motor/generator drive circuit 7 and electromagnetic solenoid 36a. It is possible to apply the braking force to the vehicle by utilizing a counter electromotive force in motor/generator 2. A braking torque augmentation control for motor/generator 2 is carried out in such a way that when motor/generator 2 functions as the generator, the duty ratio of duty control signal DS supplied to chopper 7a of motor/generator drive circuit 7 is increased so that a counter electromotive force developed is increased to augment the braking torque. In addition, when motor/generator 2 functions as the electric motor, the duty ratio of duty control signal DS is reduced so that the drive torque is reduced and the brake torque is, in turn, increased. In addition, the braking torque reduction control of motor/generator 2 is carried out in the following. When motor/generator 2 functions as the generator, the duty ratio of duty control signal DS is reduced so that the developed counter electromotive force is reduced and the braking torque is reduced. When motor/generator 2 functions as the electric motor, the duty ratio of duty control signal DS is enlarged so that the drive torque is increased and the brake torque is reduced.

Next, various operating states of engine 1 and motor/generator 2 carried out in the motor/generator controller 12 in accordance with a vehicular running state, a state of battery device 6, and a vehicular operating state will be described below.

As described above, engine 1 is stopped during the stop of the vehicle in case of the engine idling stop function provided in the hybrid vehicle of the first embodiment.

Then, suppose that a manipulation of select lever causes a running speed range including a drive range D to be selected. Or suppose that even if the manipulation of select lever causes a parking range P or neutral range N to be selected, the opening angle of throttle valve TH is in excess of "0" (exceeding zero angle). In either of these cases, if motor/generator 2 is reversely rotated at a predetermined speed (required is the engine speed and torque), pinion carrier C cannot rotate reversely by means of one-way clutch OWC. Hence, engine 1 is, in turn, rotated in the positive direction. In this state, a fuel is injected so that engine 1 is started. In addition, along with the start of engine 1, the drive of oil pump 13 is started. It is possible to rotate positively motor/generator 2 to develop the torque in the positive direction and to rotationally drive engine 1, with engine 1 and motor/generator 2 directly coupled together.

It is possible to rotate positively motor/generator 2 to develop the torque in the positive direction and to rotationally drive motor/generator 2, with engine 1 and motor/generator 2 directly coupled.

Figure 4A:
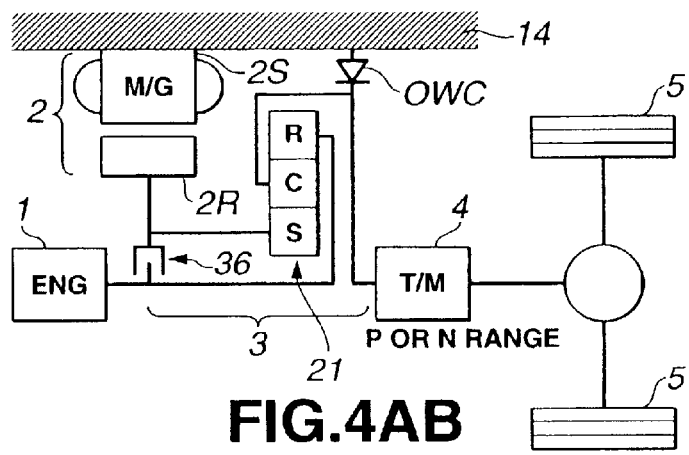
FIGS. 4AA and 4AB are a schematic block diagram and an alignment chart of the drive system of the parallel hybrid vehicle when a battery device of the hybrid vehicle shown in FIG. 1 is charged.
Figure 4A:
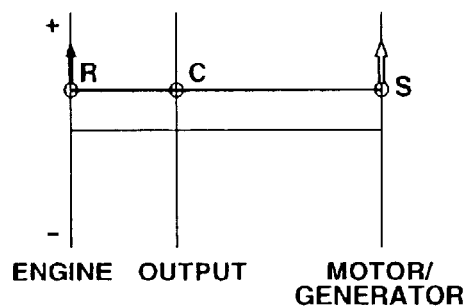
Figure 4B:
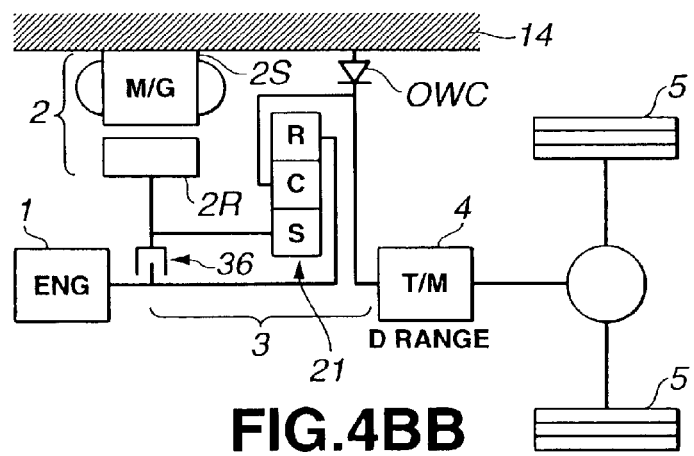
FIGS. 4BA and 4BB are a schematic block diagram and an alignment chart of the drive system of the parallel hybrid vehicle when the battery device of the hybrid vehicle shown in FIG. 1 is charged.
Figure 4B:
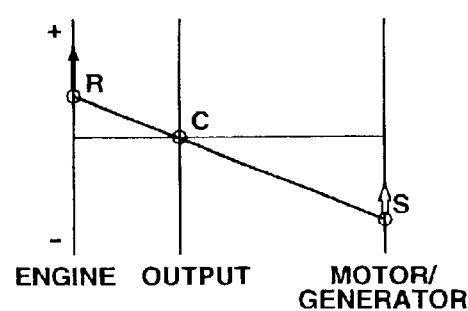
Figure 5A:
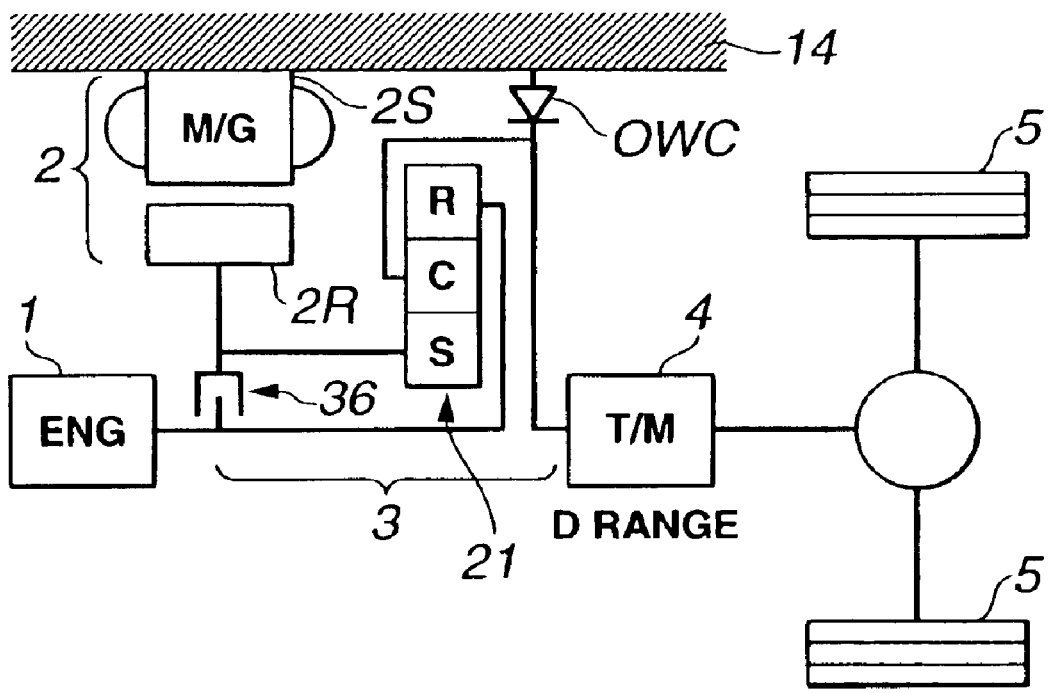
FIGS. 5A and 5B are a schematic block diagram and an alignment chart of the drive system of the parallel hybrid vehicle when the vehicle shown in FIG. 1 is started and accelerated.
Figure 5B:
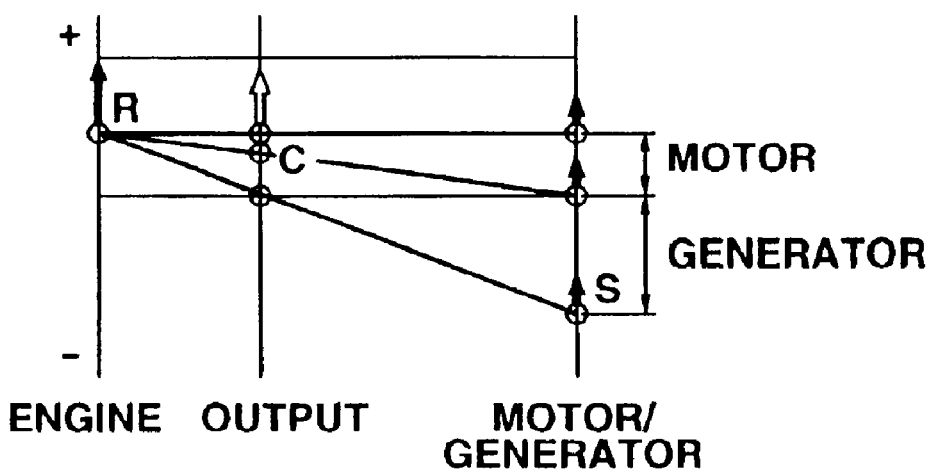

In this way, in a case where it is not necessary to start the vehicle after engine 1 is started, that is to say, in a case where a foot brake is depressed deeply after engine 1 is started, a power supply accumulation (charging) is carried out in a battery device 6 such as a battery utilizing a rotary drive force of engine 1. That is to say, a power generation is carried out using motor/generator 2 as the generator. At this time, in a case where the speed range selected by the select lever is at parking range P or neutral range N, input end and output end of transmission 4 are not connected with each other. Hence, as shown in FIGS. 4AA and 4AB, lock-up clutch 36 directly couples engine 1 with motor/generator 2. While engine 1 positively rotates motor/generator 2 to apply the positive torque thereto so that the power generation is carried out. On the other hand, when the running range including drive range D is selected by the select lever, the input end and output end of transmission 4 are connected. Hence, as shown in FIGS. 4BA and 4BB, the positive torque is applied to ring gear R to function motor/generator 2 as the generator while engine 1 reversely revolving motor/generator 2 utilizing pinion carrier C not revolving in the reverse direction due to the inhibit of the reverse rotation by means of one-way clutch OWC. Motor/generator 2, at this time, carries out the power generation.

In addition, when the running range including drive range D is selected and an accelerator pedal is depressed, the positive directional torque is developed to gradually rotate motor/generator 2 while maintaining engine speed at a target engine speed $N_{EP}$ preset to a large value as the opening angle of throttle valve becomes large under a released state of lock-up clutch 36 in order to start the vehicle. Consequently, the positive torque is applied to pinion carrier C to start and accelerate the vehicle. At this time, when motor/generator 2 is reversely rotated, motor/generator 2 functions as power generator and when motor/generator 2 is positively rotated, motor/generator 2 functions as the motor.

Figure 6A:
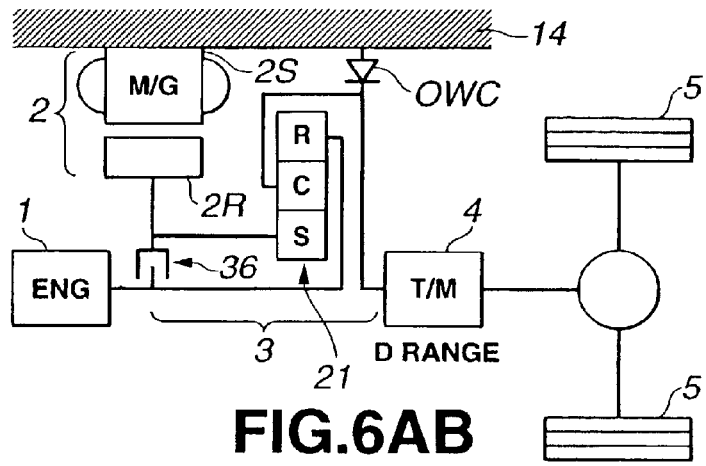
FIGS. 6AA and 6AB are a schematic block diagrams and an alignment chart of the drive system of the parallel hybrid vehicle when the vehicle shown in FIG. 1 is ordinarily running.
Figure 6A:
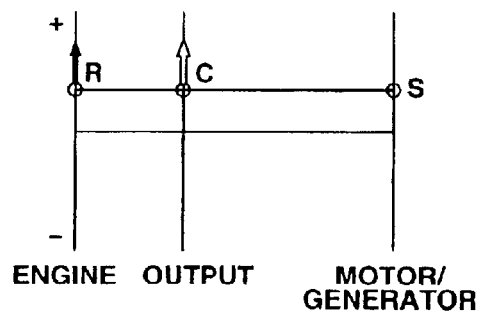
Figure 6B:
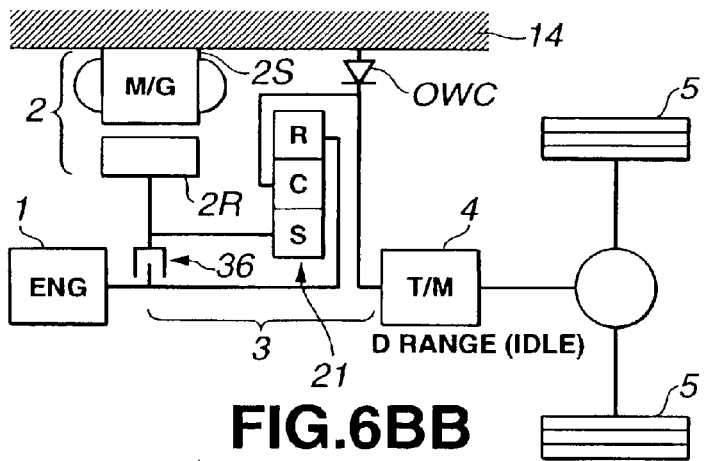
FIGS. 6BA and 6BB are a schematic block diagram and an alignment chart of the drive system of the parallel hybrid vehicle when the vehicle shown in FIG. 1 is ordinarily running.
Figure 6B:
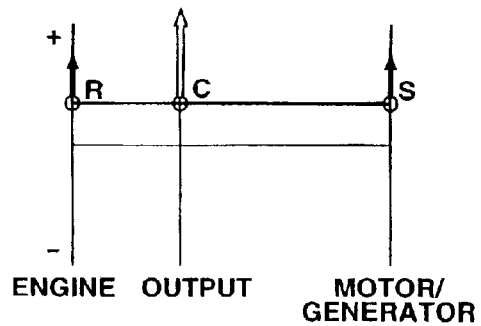

At a later time, when revolution speed of motor/generator 2 is made coincident with or substantially coincident with an engine speed at which a predetermined engine speed, viz., target engine speed $N_{EP}$ is maintained, lock-up clutch 36 is engaged so that engine 1 is directly coupled to motor/generator 2 to run the vehicle. For example, under such situations that the vehicle is running at a vehicular speed equal to or higher than a certain speed, a depression depth of the accelerator pedal is large (deep), the speed reduction ratio within transmission 4 is large, or a charge quantity of battery device 6 is small, it is disadvantageous of using motor/generator 2 as the motor. Hence, as shown in FIGS. 6AA and 6AB, motor/generator 2 does not develop the torque but the torque is developed only from engine 1 under a, so-called, free run state of motor/generator 2 and the vehicle runs in this state. On the other hand, under such running situations that the vehicular velocity is low, the depression depth of the accelerator pedal is small (shallow), a speed reducing ratio within transmission 4 is small, the charge quantity of battery device 6 is much, no disadvantage of using motor/generator 2 as the motor is raised. Hence, as shown in FIGS. 6BA and 6BB, motor/generator 2 is positively rotated to develop the positive directional torque and to assist performance of engine 1.

Figure 7A:
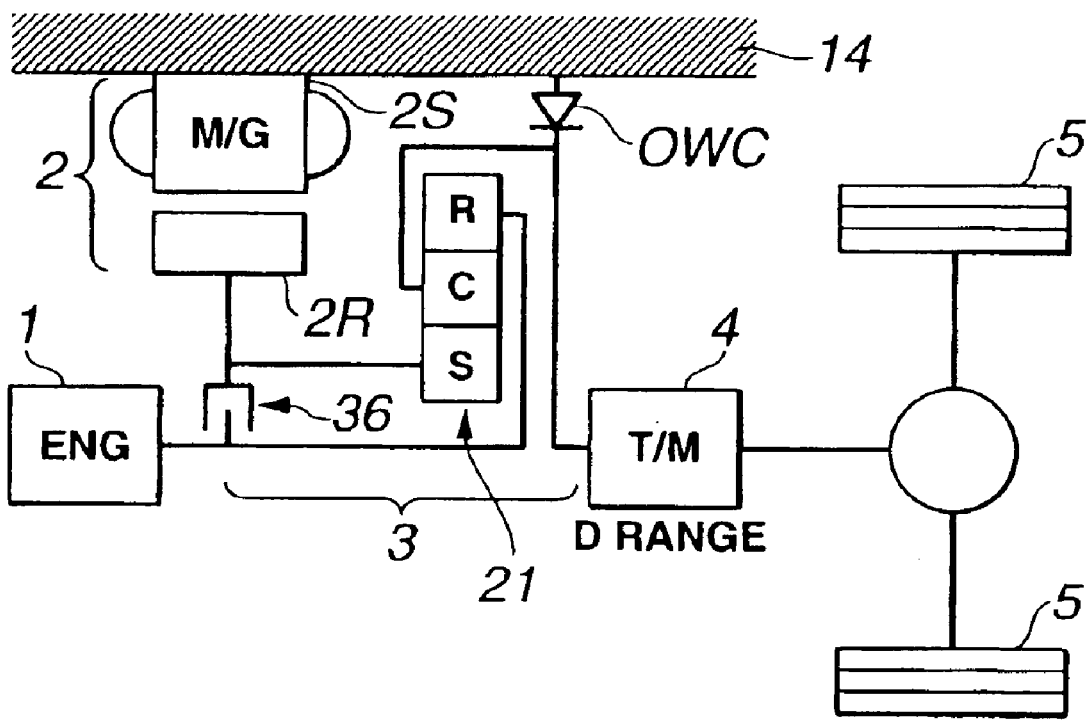
FIGS. 7A and 7B are a schematic block diagram and an alignment chart of the drive system of the parallel hybrid vehicle when a motor/generator of the vehicle shown in FIG. 1 is regenerated.
Figure 7B:
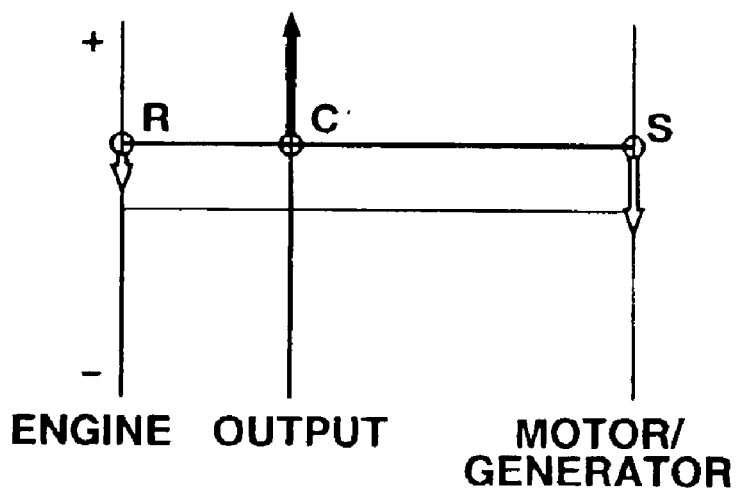

On the contrary to such a vehicular acceleration running state as described above, under such a vehicular deceleration state that a, so-called, engine brake is expected to be effected. Motor/generator 2 is used as the generator with lock-up clutch 36 engaged, as shown in FIGS. 7A and 7B, develops a negative directional torque for a road surface reaction force torque to strengthen a braking force in place of the engine brake that engine 1 naturally has or in addition to the engine brake.

Figure 8A:
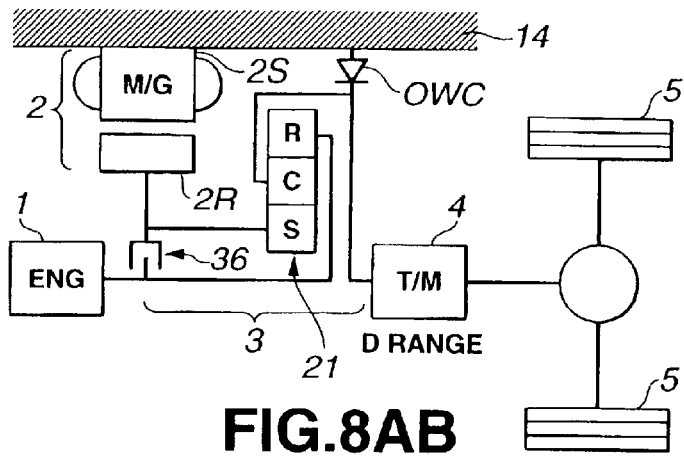
FIGS. 8AA and 8AB are a schematic block diagram and an alignment chart of the drive system of the parallel hybrid vehicle when the vehicle shown in FIG. 1 is in a creep run.
Figure 8A:
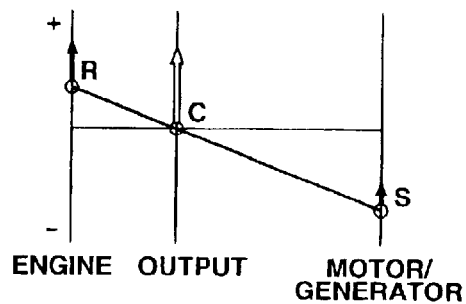
Figure 8B:
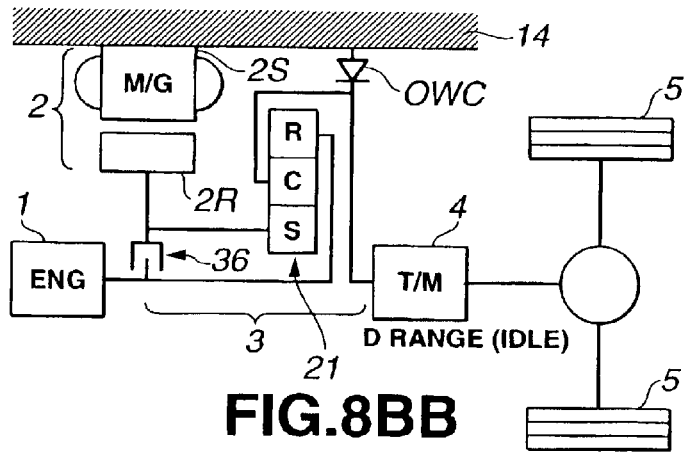
FIGS. 8BA and 8BB are a schematic block diagram and an alignment chart of the drive system of the parallel hybrid vehicle when the vehicle shown in FIG. 1 is in the creep run.
Figure 8B:
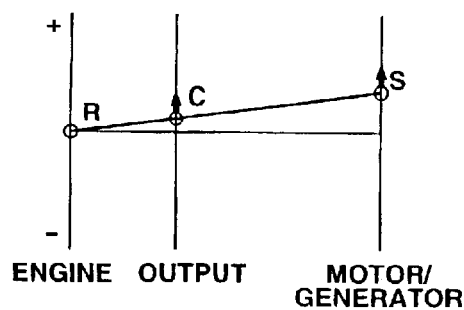

Other than such general running situations as described above, in the first embodiment, a creep running mode in the running range including drive range D is set. For example, under a situation immediately after engine 1 is started, the positive torque is developed from engine 1 which is in the idling state while motor/generator 2 develops the positive torque, as shown in FIGS. 8AA and 8AB, the synthesized torque of both engine 1 and motor/generator 2 causes the vehicle to perform a creep run. When engine 1 is not started, motor/generator 2 may positively rotate to develop the positive directional torque so that the vehicle is enabled to perform the creep run, as shown in FIGS. 8BA and 8BB.

Figure 9A:
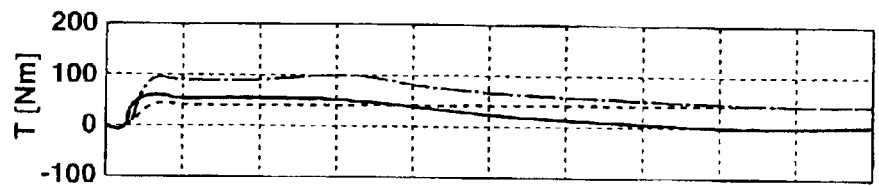
FIGS. 9A, 9B, 9C, 9D, 9E, and 9F are timing charts representing operating states of the engine and motor/generator when the parallel hybrid vehicle shown in FIG. 1 is started and accelerated.
Figure 9B:
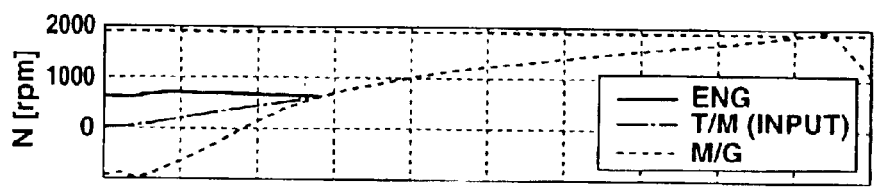
Figure 9C:
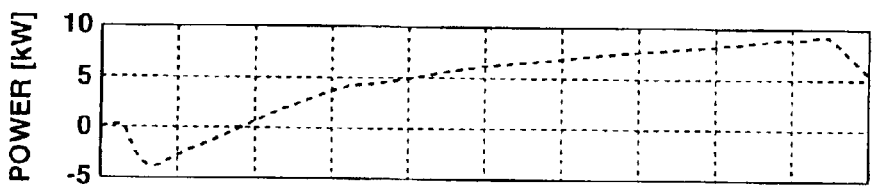
Figure 9D:
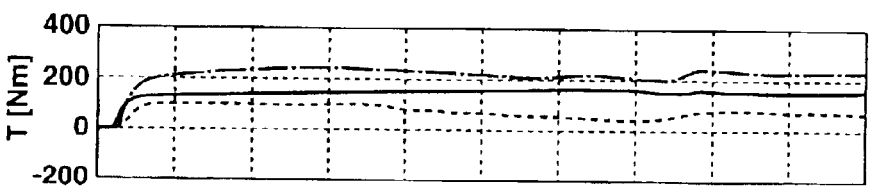
Figure 9E:
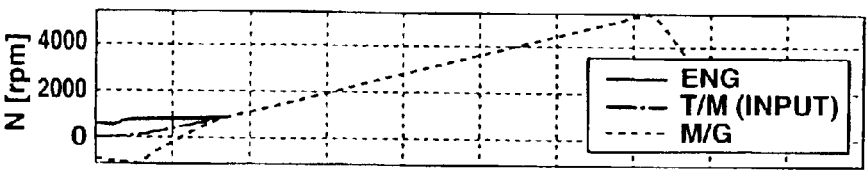
Figure 9F:
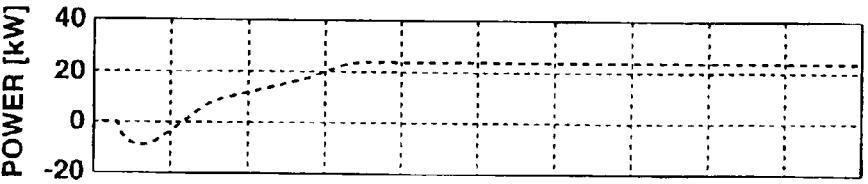

FIGS. 9A through 9C show timing charts of torque, revolution speeds, power of the hybrid vehicle when the parallel hybrid vehicle shown in FIG. 1 is started under such a state as an extremely slight (shallow) depression on the accelerator pedal. In such a state as described with reference to FIGS. 9A through 9C, it is not necessary to accelerate remarkably the vehicle, for example, by high-speed revolutions of motor/generator 2. Hence, while motor/generator 2 in the reverse rotation state immediately after engine 1 is started is positively rotated at a slow pace so that a positive directional constant torque is developed. Thereafter, after the direct coupling between engine 1 and motor/generator 2, the output torque of engine 1 is further reduced so that the vehicle can be started and can be accelerated substantially only by motor/generator 2. On the contrary, FIGS. 9D through 9F show timing charts of the torque, revolution speeds, and the power of the vehicle when the vehicle is started in a state in which the accelerator pedal is fully depressed.

A high-speed revolution of motor/generator 2 results in a reduction of a motor torque. In many cases, this is not sufficient to accelerate the vehicle. Hence, motor/generator 2 in the reverse rotation state immediately after engine 1 is started is speedily rotated in the positive direction, the direct coupling between engine 1 and motor/generator 2 is made earlier. After the direct coupling, the output torques of engine 1 and of motor/generator 2 are utilized to start and accelerate the vehicle so that the vehicular velocity reaches speedily to a high velocity value.

Figure 10:
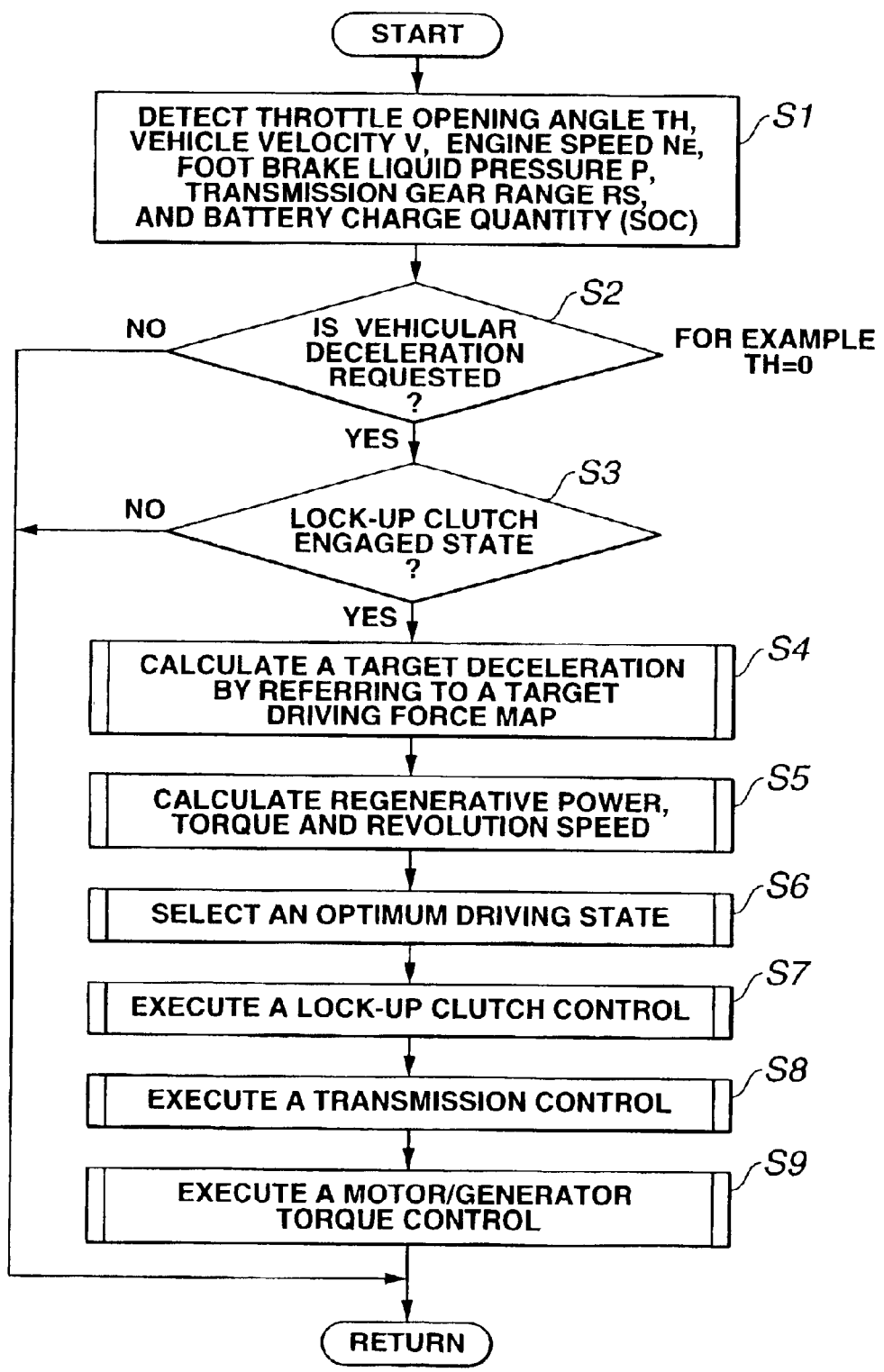
FIG. 10 is an flowchart representing an arithmetic processing content of a motor/generator controller in the embodiment of the parallel hybrid vehicle shown in FIG. 1 according to the present invention during a vehicular deceleration.

Various arithmetic processes are executed by arithmetic processing unit 12b within motor/generator controller 12 in order to perform such a series of controls over motor/generator 2. From among these arithmetic processes, FIG. 10 shows an arithmetic processing executed during a vehicular deceleration. The control flowchart shown in FIG. 10 is executed as a timer interrupt routine for each predetermined sampling period ΔT of approximately 10 milliseconds. It is noted that although, in FIG. 10, a step for the mutual communications with engine controller or transmission controller is not provided, necessary information is arbitrarily read from each controller or memory and the information obtained by the arithmetic processing is, at nay time, outputted to each controller and memory.

In details, at a step S1, arithmetic processing unit 12b of motor/generator controller 12 reads throttle opening angle TH detected by throttle opening angle sensor 11, a running speed (vehicular velocity) V detected by vehicular velocity sensor 14, engine speed $N_E$ detected by engine speed sensor 8, brake liquid pressure P detected by brake liquid pressure sensor 15, gear speed range R (in this case, representing transmission gear ratio) controlled by transmission controller TC, a charge quantity SOC (State of Charge) (in FIG. 10, representing a battery charge quantity and indicated in a charge rate to a battery capacity) of charge device 6. Then, at the next step S2, arithmetic processing unit 12b of motor/generator controller 12 determines whether throttle opening angle TH read at step S1 is zeroed to determine whether the vehicular deceleration is being requested. If Yes at step S2, the routine goes to a step S3. If No at step S2, the routine returns to a main program. At a step S3, arithmetic processing unit 12b of motor/generator controller 12 determines if lock-up clutch 36 is in the engaged state. If lock-up clutch 36 is in the clutched state (Yes) at step S3, the routine goes to a step S4. If No at step S3, the routine is returned to the main program.

Figure 11:
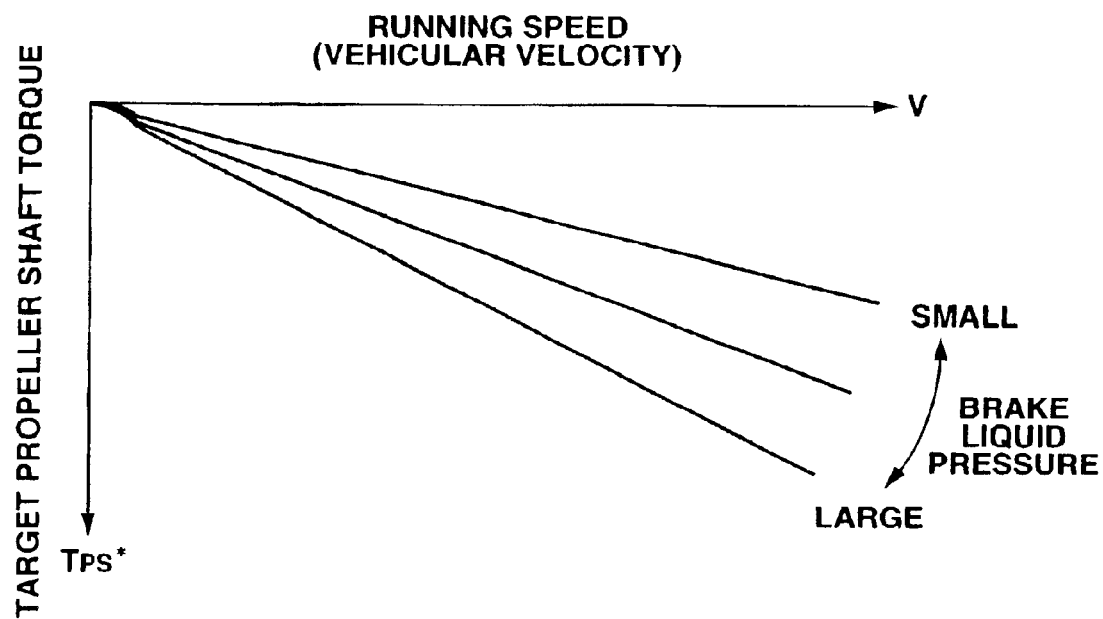
FIG. 11 is a control map used in the arithmetic processing shown in FIG. 10 in the embodiment of the hybrid vehicle shown in FIG. 1 according to the present invention.

At step S4, arithmetic processing unit 12b of motor/generator controller 12 calculates a target deceleration by referring to a target driving force map shown in FIG. 11 in accordance with an individual arithmetic processing. In this case, a target torque $T_{PS}^*$ of a propeller shaft which is a vehicular final output axle is determines as the target deceleration. First, from the control map shown in FIG. 11, arithmetic processing unit 12b of motor/generator controller 12 calculates target propeller shaft torque $T_{PS}^*$ such as to become larger in the negative direction as running speed V read at step S1 becomes increased (the numerical value is a negative value and an absolute value thereof becomes larger).

Figure 12:
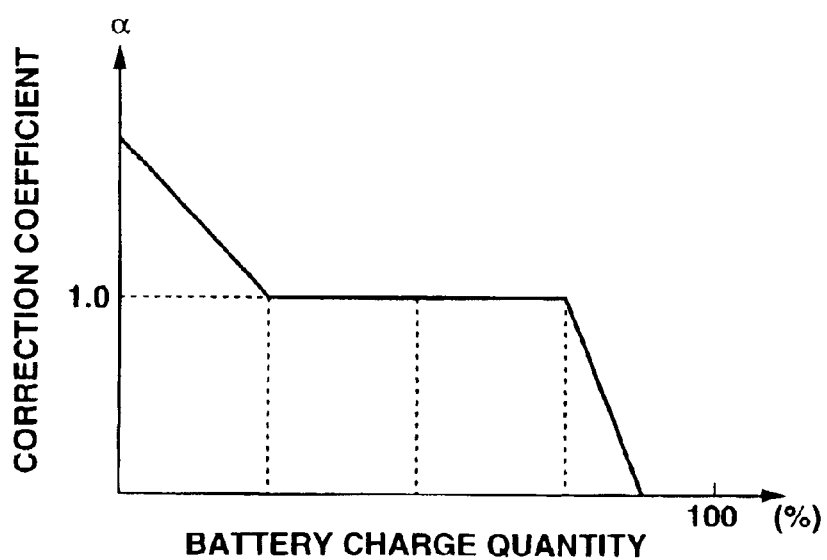
FIG. 12 is a control map used in the arithmetic processing content of the motor/generator controller in the embodiment of the hybrid vehicle according to the present invention.

Furthermore, in this embodiment, a control map represented by FIG. 12 is used. Arithmetic processing unit 12b of motor/generator controller 12 calculates a correction coefficient α which is larger than "1" when the battery charge quantity is remarkably small and which is smaller than "1" when the battery charge quantity is remarkably large using a control map shown in FIG. 12. This correction coefficient α calculates a final target propeller shaft torque $T_{PS}^*$ by multiplying correction coefficient α with target propeller shaft torque $T_{PS}^*$ derived from a control map shown in FIG. 11. In addition, according to its necessity, arithmetic processing unit 12b of motor/generator controller 12 may correct target propeller shaft torque TPS* according to a road environment (ascending slope or descending slope) and a vehicular weight.

Next, the routine goes from step S4 to step S5. At step S5, arithmetic processing unit 12b of motor/generator 12 calculates a power regeneration, an engine torque, a motor/generator torque, an engine speed, and motor/generator revolution speed in accordance with a minor program shown in FIG. 13.

In this arithmetic processing, motor/generator controller 12 calculates engine speed, motor/generator revolution speed, engine torque, motor/generator torque, and regenerative power for each transmission range under a lock-up clutch state at step S51. The torque of propeller shaft which is the final output axle with the lock-up clutch engaged is a multiplication of an addition value between engine torque $T_E$ and motor/generator torque $T_{M/G}$ by transmission gear ratio R.

Figure 14:
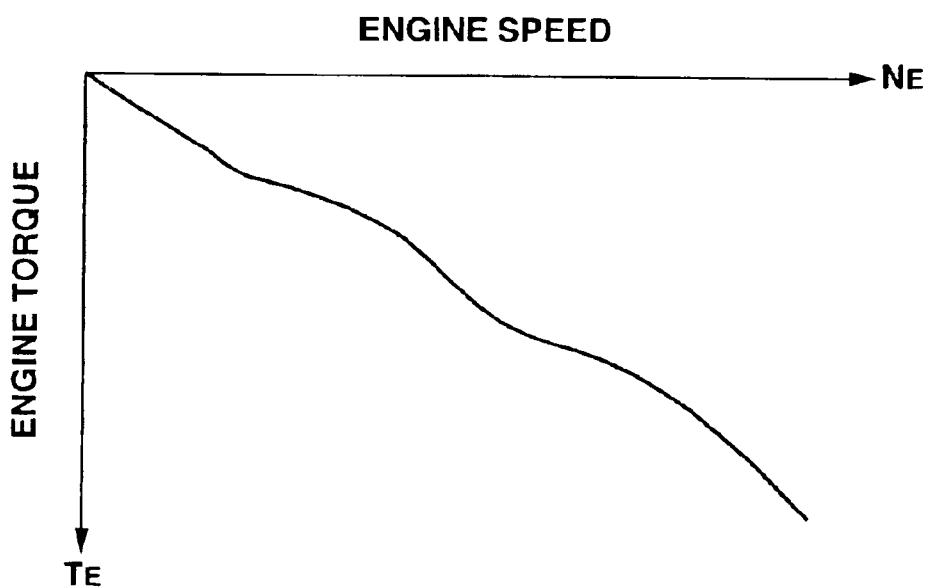
FIG. 14 is a control map used in the arithmetic processing in FIG. 13 of the embodiment of the parallel hybrid vehicle shown in FIG. 1.

FIG. 14 shows an engine torque $T_E$ when throttle opening angle TH is zeroed (at "0") which can be determined from engine speed $N_E$. Hence, motor/generator torque $T_{M/G}$ when a target propeller shaft $T_{PS}^*$ calculated at step S4 can be achieved can be determined by target propeller shaft $T_{PS}^*$ divided by transmission gear ratio R and by subtracting engine torque $T_E$ from a result of the above division.

Figure 15:
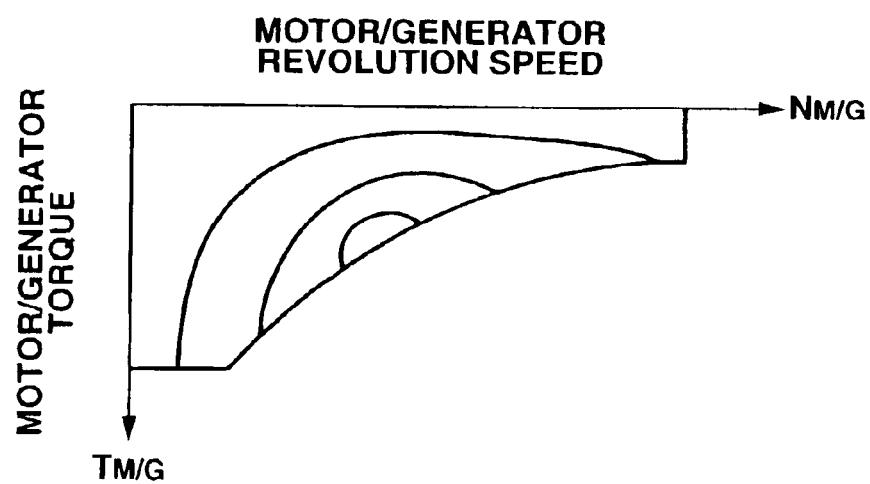
FIG. 15 is a control map used in the arithmetic processing shown in FIG. 13.

In addition, since the lock-up clutch is engaged, motor/generator speed $N_{M/G}$ is equal to engine speed $N_E$. If motor/generator speed $N_{M/G}$ and motor/generator torque $T_{M/G}$ are obtained, a regenerative efficiency $\eta_{M/G}$ is calculated from a control map shown in FIG. 15 and is multiplied by a product between motor/generator speed $N_{M/G}$ and motor/generator torque $T_{M/G}$ to derive a regenerative power.

In FIG. 13 which shows a subroutine of step S5 shown in FIG. 10, the routine goes to a step S51. At step S51, arithmetic processing unit 12b of motor/generator 12 calculates engine speed $N_E$, motor/generator speed $B_{M/G}$, motor/generator torque $T_{M/G}$, engine torque $T_E$, and a regenerative power in a state in which the lock-up clutch is engaged for each transmission gear range. At the next step S52, arithmetic processing unit 12b of motor/generator 12 calculates engine speed $N_E$, motor/generator speed $B_{M/G}$, and motor/generator torque $T_{M/G}$, engine torque $T_E$, and the regenerative power in a state in which the lock-up clutch is released for each transmission gear range in the same way as step S51. Next, the routine goes to step S6 of the arithmetic processing unit shown in FIG. 10. Motor/generator torque $T_{M/G}$ when the lock-up clutch is released is a value of engine torque $T_E$ multiplied by a gear ratio $\alpha$ of the differential unit (sun gear number of tooth/ring gear number of tooth). Hence, after this value is substituted into a relation equation from among motor/generator torque $T_{M/G}$, gear ratio R, and target propeller shaft torque $T_{PS}*$ is divided by gear ratio R and further divided by (1+gear ratio cc) to provide engine torque $T_E$. Engine speed $N_E$ uses this engine torque $T_E$ and is determined by tracing back to the control map shown in FIG. 14. Motor/generator torque $T_{M/G}$ is determined from the relation equation to engine torque $T_E$. On the other hand, motor/generator speed $N_{M/G}$ is determined as follows: That is to say, at first, an input axle rotation speed of the transmission or an output axle rotation speed of the differential unit, i.e., a carrier rotation speed Nc is determined from running speed V, gear ratio R, final speed-reduction ratio, and tire rolling dynamic radius. A value of a subtraction of engine speed $N_E$ from carrier revolution speed $N_E$ is divided by the gear ratio $\alpha$. This result is added to carrier revolution speed Nc to derive motor/generator speed $N_{M/C}$. A method of calculating the regenerative power is the same as those described at step S51.

Figure 16:
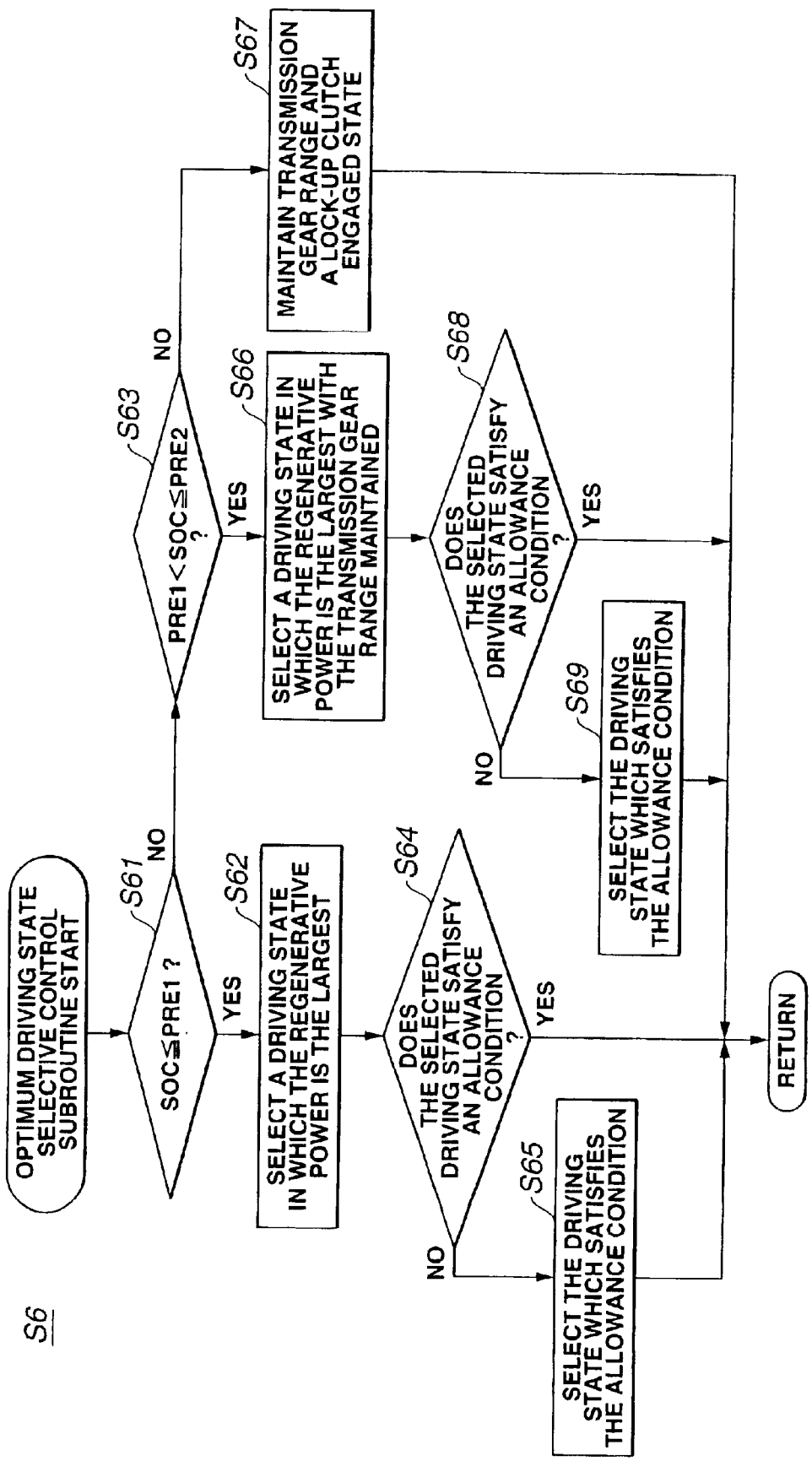
FIG. 16 is a flowchart representing a minor program executed in the arithmetic processing shown in FIG. 10.

Then, at a step S6 shown in FIG. 10, arithmetic processing unit 12b of motor/generator 12 carries out a selection of an optimum driving state in accordance with a minor program shown in FIG. 16. In this arithmetic processing shown in FIG. 16, at a step S61, arithmetic processing unit 12b of motor/generator 12 determines whether battery charge quantity SOC read at step S1 is equal to or less than a relatively small first predetermined value (PRE1), specifically, is equal to or less than a chargeable value in a higher priority. If battery charge quantity SOC is equal to or less than first predetermined value (PRE1) (Yes) at step S61, the routine goes to a step S62. If No at step S61, the routine shown in FIG. 16 goes to a step S63.

At step S62, arithmetic processing unit 12b of motor/generator controller 12 selects one of the driving states in which a largest representative powers which have been calculated at step S5 is obtained. Then, the routine goes to a step S64. At step S64, arithmetic processing unit 12b of motor/generator controller 12 determines whether the selected driving state at step S62 satisfies an allowance condition. If the selected driving state satisfies the allowance condition (Yes) at step S64, the routine shown in FIG. 14 jumps to step S7 shown in FIG. 10. If No at step S64, the routine goes to step S7. If No at step S64, the routine goes to a step S65. The allowance condition, for example, is defined as follows: 1), for example, engine speed $N_E$ is equal to or higher than idling speed $N_{M/G}$ but is equal to or lower than a maximum revolution limit value; 2) motor/generator speed $N_{M/G}$ is equal to or higher than zero but is equal to or lower than the maximum revolution limit value; and 3) motor/generator torque $T_{M/G}$ is equal to or higher than zero but is equal to or higher than zero but is equal to or lower than a maximum torque.

At step S65, arithmetic processing unit 12b of motor/generator controller 12 selects the other driving state which satisfies the allowance condition and the routine jumps to step S7 shown in FIG. 10. In details, at step S65, arithmetic processing unit 12b of motor/generator controller 12 selects one of the driving states which satisfies the following priority condition. The priority condition is such that a large regenerative power is a highest priority. However, the subsequent priority conditions are such that the small battery charge quantity SOC results in a higher priority order of the regenerative power.

On the other hand, at a step S63, arithmetic processing unit 12b of motor/generator 12 determines whether battery charge quantity SOC is larger than first predetermined value PRE1 and is equal to or below a second predetermined value PRE2, viz., specifically, a value requiring no charging. If PRE1≦SOC≦PRE2 (Yes) at step S63, the routine goes to step S66. If No at step S63, the routine goes to step S67.

At step S66, arithmetic processing unit 12b of motor/generator controller 12 goes to a step S68 after selecting the driving state in which the regenerative power is the largest, maintaining the gear speed range, from among the calculated regenerative power calculated at step S5. At step S68, arithmetic processing unit 12b of motor/generator controller 12 determines whether the driving state selected at step S66 satisfies the allowance condition. If the selected driving state satisfies the allowance condition (Yes) at step S68, the routine jumps to step S7 shown in FIG. 10. It No at step S68, the routine goes to a step S69.

At a step S67, arithmetic processing unit 12b of motor/generator controller 12 maintains the present gear speed range and maintains the lock-up clutch state and the routine goes to step S7.

At step S7 in the arithmetic processing unit shown in FIG. 10, the control of the lock-up clutch is carried out in conformity to the clutch and release states of the lock-up clutch set at step S6.

At step S7 of the arithmetic processing shown in FIG. 10, the control over the lock-up clutch is carried out in conformity to the clutch or release state set at step S6. Next, the routine goes to a step S8. The control over the gear unit is carried out by outputting a gear range command value to transmission controller TC in accordance with the gear range set at step S6 in accordance with the individual arithmetic processing (not shown).

At the next step S9, arithmetic processing unit 12b of motor/generator 12 performs motor/generator torque control (M/G torque) and returns to the main program.

In order to achieve target propeller shaft torque $T_{PS}*$ for motor/generator torque control, the control over motor/generator torque is carried out. Motor/generator torque $T_{M/G}$ estimated at step S6 is steady-state value. It is necessary to control an inertia variation and enclosed sound in a suppression manner. First, the suppression of the inertia variation is to calculate a carrier torque Tc as an output axle torque of the differential unit with target propeller shaft torque $T_{PS}*$ divided by gear ratio R. This carrier torque Tc is an addition value between motor/generator torque $T_{M/G}$ and engine torque $T_E$. This motor/generator torque $T_{M/G}$ is an addition value from among a motor/generator output torque $T_{M/GO}$, motor/generator friction torque $T_{M/GF}$, and a motor/generator inertia torque $T_{M/GI}$.

Motor/generator inertia torque $T_{M/GI}$ is a product value between a motor/generator inertia $I_{M/GI}$ and motor/generator angular acceleration $\omega'_{M/G}$. On the other hand, since the engine throttle valve in a throttle off state (opening angle TH is zeroed), engine torque $T_E$ is an addition value between engine friction torque $T_{EF}$ and engine inertia torque $T_{EI}$. Engine inertia torque $T_{EI}$ is a product between engine inertia $I_E$ and engine angular acceleration $\omega'_E$. It is possible to calculate motor/generator angular acceleration $\omega'_{M/G}$ and engine angular acceleration $\omega'_E$ from motor/generator revolution speed $N_{M/G}$ and engine speed $N_E$ calculated at step S6.

Each friction torque $T_{M/GF}$ and $T_{EF}$ can be calculated using engine speeds and revolution speed $N_{M/G}$ and $N_E$ by means of a map search. It is possible to perform motor/generator torque control to suppress the inertia variation. On the other hand, the motor/generator torque control to suppress the enclosed sound can be achieved by adding a torque variation in an opposite phase of a ripple of engine torque $T_E$ to motor/generator torque $T_{M/G}$.

In the arithmetic processing described above, the driving state to achieve target propeller shaft torque TPS* which is a specific numerical value of the target deceleration, for example, motor/generator speed $N_{M/G}$, engine speed $N_E$, motor/generator torque $T_{M/G}$, engine torque $T_E$, and regenerative power are calculated for both of the clutched state and released state of lock-up clutch 36 for each gear speed range achievable in transmission is calculated. As battery charge quantity SOC becomes small, one of the various driving states which is a large regenerative power is selected. If the solenoid driving state satisfies the allowance condition, the selected driving state is further selected. If the selected driving state does not satisfy the allowance condition, another driving condition which satisfies the priority condition is selected. Since the driving states of the engine and motor/generator, the operation state of lock-up clutch 36, gear speed range of the transmission are controlled according to the selected driving state, the desired regenerative power can be obtained.

In the embodiment, the microcomputer (microprocessor) is used for each of the above-described controllers. However, in place of the microcomputer, various types of arithmetic processing circuits may be used. In addition, the position of lock-up clutch 36 is not limited to that described in the embodiment but may be interposed between the sun gear and the carrier or between the carrier and the ring gear. It is noted that although, in the embodiment described above, transmission 4 is the four-speed range automatic transmission, transmission may be constituted by a continuously variable transmission (CVT).

Furthermore, the coupling method of coupling the outputs of the engine and motor/generator to the three elements of the planetary gear mechanism described above are not limited to that described in the above-described embodiment. It is noted that a requested deceleration state estimating section corresponds to step S2 shown in FIG. 10 and the requested deceleration state estimating section may estimate the vehicular deceleration state on the basis of at least one of the vehicular running speed V and the brake manipulated variable detected by an accelerator manipulated variable (manipulated variable is zeroed) detected by the accelerator manipulated variable sensor 16A of an accelerator 16 and at least one of the vehicular velocity detecting section 14 and a brake pedal depression depth sensor 17A of a brake pedal 17, in place of the throttle opening angle of throttle opening angle sensor 11.

The entire contents of a Japanese Patent Application No. 2001-303926 (filed in Japan on Sep. 28, 2001) are herein incorporated by reference. The scope of the invention is defined with reference to the following claims.

What is claimed is:

1. A hybrid vehicle, comprising:
an engine;
a charge device;
a transmission;
a motor/generator having both functions of
   an electric motor and a generator and carrying out supply and receipt of an electric current to and from the charge device;
a differential unit having a first axle connected to an output axle of the engine, a second axle connected to an output axle of the motor/generator, and a third axle connected to an input axle of the transmission;
a clutch adapted to directly couple the engine and the motor/generator to be engaged when a difference in revolution speed between an engine speed of the engine and a revolution speed of the motor/generator becomes equal to or lower than a predetermined value during a start of the vehicle; and
a controlling section that enables control of an optimum state of the clutch, driving states of the motor/generator and the engine, and gear speed range of the transmission, the controlling section comprising:
   requested deceleration state estimating section that estimates a requested vehicular deceleration state on the basis of at least one of a vehicular running speed and a brake manipulated variable of a vehicular brake system;
   a calculating section that calculates the engine speed of the engine, the revolution speed of the motor/generator, and a regenerative power obtained by the motor/generator under both of released and clutched states of the clutch for each gear speed range achievable by the transmission on the basis of the requested vehicular deceleration state estimated by the requested deceleration state estimating section; and
   an optimum driving state selecting section that selects one of the gear speed ranges of the transmission and an operation state of the clutch on the basis of the engine speed of the engine, the revolution speed of the motor/generator, and the regenerative power obtained by the motor/generator calculated by the calculating section in such a manner that as a charge state of the charge device becomes smaller, the regenerative power obtained by the motor/generator becomes larger, wherein the controlling section is adapted to control the operation state of the clutch, the driving states of the engine and motor/generator, and the gear speed range of the transmission on the basis of the gear speed range of the transmission and the clutched state of the clutch related to the driving state selected by the optimum driving state selecting section.

2. A hybrid vehicle as claimed in claim 1, wherein the hybrid vehicle comprises an accelerator manipulated variable detecting section that detects a manipulated variable of a vehicular accelerator; a vehicular velocity detecting section that detects a running speed of the vehicle; and a brake pedal depression depth detecting section that detects a depression depth of the brake pedal and wherein the requested deceleration state estimating section estimates the requested vehicular deceleration state on the basis of at least one of the vehicular running speed and the brake manipulated variable detected by the accelerator manipulated variable detecting section and at least one of the vehicular velocity detecting section and the brake pedal depression depth detecting section.

3. A hybrid vehicle as claimed in claim 1, wherein the hybrid vehicle comprises a throttle opening angle detecting section that detects an opening angle of an engine throttle valve and the requested deceleration state estimating section comprises a requested deceleration state determining section that determines whether the opening angle of the engine throttle valve is zeroed to determine whether a request of the vehicular deceleration occurs.

4. A hybrid vehicle as claimed in claim 3, wherein the hybrid vehicle comprises a clutch state determining section that determines whether the clutch is in the clutched state or in the released state; and a target deceleration calculating section that calculates a target torque $T_{PS}^*$ of a propeller shaft according to the running speed of the vehicle and according to a brake liquid pressure of the vehicular brake system when the clutch state determining section determines that the clutch is in the clutched state.

5. A hybrid vehicle as claimed in claim 4, wherein the calculating section calculates the engine speed, an engine torque, a motor/generator torque, the motor/generator speed, and the regenerative power with a clutch engaged state maintained for each gear speed range of the transmission when the clutch state determining section determines that the clutch is in the clutched state.

6. A hybrid vehicle as claimed in claim 4, wherein the calculating section calculates the engine speed, an engine torque, a motor/generator torque, the motor/generator speed, and the regenerative power when the clutch is in a clutch released state for each gear speed range of the transmission when the clutch state determining section determines that the clutch is in the clutched state.

7. A hybrid vehicle as claimed in claim 4, wherein the target deceleration calculating section calculates the target torque $T_{PS}^*$ of the propeller shaft in such a manner that as the vehicular running speed is increased, the target torque $T_{PS}^*$ of the propeller shaft becomes larger in a negative direction and in such a manner that as the brake liquid pressure of the vehicular brake system becomes increased, the target torque $T_{PS}^*$ becomes larger in the negative direction.

8. A hybrid vehicle as claimed in claim 7, wherein the controlling section further comprises a correction coefficient determining section that determines a correction factor for the target torque $T_{PS}^*$ of the propeller shaft in such a manner that as the charge quantity of the charge device becomes remarkably smaller, the correction factor becomes larger than one and as a charge quantity of the charge device becomes remarkably larger, the correction factor becomes smaller than one, the correction factor being multiplied with the target torque of the propeller shaft to determine a final target torque $T_{PS}^*$ of the propeller shaft.

9. A hybrid vehicle as claimed in claim 1, wherein the hybrid vehicle comprises a charge quantity detecting section that detects a charge quantity in the charge device and wherein the optimum driving state selecting section comprises: a first charge state determining section that determines whether the charge quantity in the charge device is equal to or lower than a first predetermined value; a first driving state selecting section that selects one of a plurality of driving states in which the regenerative power is the largest when the first charge state determining section determines that the charge quantity is equal to or lower than the first predetermined value; and an allowance condition determining section that determines whether the selected driving state by the first driving state selecting section satisfies at least one allowance condition and wherein the controlling section controls the operation state of the clutch, the driving states of the engine and motor/generator, and the gear speed range of the transmission on the basis of the gear speed range of the transmission and the clutched state of the clutch related to one of the driving states which is selected by the first driving state selecting section when the allowance condition determining section determines that the selected driving state satisfies at least one allowance condition.

10. A hybrid vehicle as claimed in claim 9, wherein the optimum driving state selecting section comprises: a second charge state determining section that determines whether the charge quantity in the charge device is higher than the first predetermined value but is equal to or lower than a second predetermined value; a second driving state selecting section that selects one of the driving states in which the regenerative power is the largest with the gear speed range of the transmission maintained when the second charge state determining section determines that the charge quantity is higher the first predetermined value but is equal to or lower than the second predetermined value; and another allowance condition determining section that determines whether the driving state selected by the second driving state selecting section satisfies at least one allowance condition and wherein the controlling section controls the operation state of the clutch, the driving states of the engine and motor/generator, and the gear speed range of the transmission on the basis of the gear speed range of the transmission and the operation state of the clutch related to one of the driving states selected by the second driving state selecting section when the other allowance condition determining section determines that the driving state selected by the second driving state selecting section satisfies at least one allowance condition.

11. A hybrid vehicle as claimed in claim 10, wherein the first predetermined value is a value of the charge quantity to be charged in the charge device having a predetermined high priority and the second predetermined value is a value of the charge quantity that the charge device is in no need of being charged.

12. A hybrid vehicle as claimed in claim 10, wherein the allowance condition includes an engine speed of the engine $N_E$ which is equal to or higher than an engine idling speed but is lower than a maximum speed limit value thereof, a revolution speed $N_{M/G}$ of the motor/generator which is equal to or higher than zero but is equal to or lower than a maximum revolution speed thereof, and a motor/generator torque $T_{M/G}$ is equal to or higher than zero but is equal to or lower than a maximum torque thereof.

13. A hybrid vehicle as claimed in claim 1, wherein the hybrid vehicle is adapted to regenerate the charge device without need of a clutch which cuts off power between the engine and the differential unit.

14. A hybrid vehicle, comprising:
an engine;
a charge device;
a transmission;
a motor/generator having both functions of
an electric motor and a generator and carrying out supply and receipt of an electric current to and from the charge device;
a differential unit having a first axle connected to an output axle of the engine, a second axle connected to an output axle of the motor/generator, and a third axle connected to an input axle of the transmission;
a clutch adapted to directly couple the engine and the motor/generator to be engaged when a difference in revolution speed between an engine speed of the engine and a revolution speed of the motor/generator becomes equal to or lower than a predetermined value during a start of the vehicle; and controlling means for enabling controls of an optimum state of the clutch, driving states of the motor/generator and the engine, and gear speed range of the transmission, the controlling means comprising:

requested deceleration state estimating means for estimating a requested vehicular deceleration state on the basis of at least one of a vehicular running speed and a brake manipulated variable of a vehicular brake system;

calculating means for calculating the engine speed of the engine, the revolution speed of the motor/generator, and a regenerative power obtained by the motor/generator under both of released and clutched states of the clutch for each gear speed range achievable by the transmission on the basis of the requested vehicular deceleration state estimated by the requested deceleration state estimating means; and optimum driving state selecting means for selecting one of the gear speed ranges of the transmission and an operation state of the clutch on the basis of the engine speed of the engine, the revolution speed of the motor/generator, and the regenerative power obtained by the motor/generator calculated by the calculating means in such a manner that as a charge state of the charge device becomes smaller, the regenerative power obtained by means of the motor/generator becomes larger, wherein the controlling means is adapted to control the operation state of the clutch, the driving states of the engine and motor/generator, and the gear speed range of the transmission on the basis of the gear speed range of the transmission and the clutched state of the clutch related to the driving state selected by the optimum driving state selecting means.

15. A method applicable to a hybrid vehicle, comprising utilizing components of a hybrid vehicle, the components of the hybrid vehicle comprising:

an engine;

a charge device;

a transmission;

a motor/generator having both functions of an electric motor and a generator and carrying out supply and receipt of an electric current to and from the charge device;

a differential unit having a first axle connected to an output axle of the engine, a second axle connected to an output axle of the motor/generator, and a third axle connected to an input axle of the transmission;

a clutch adapted to directly couple the engine and the motor/generator to be engaged when a difference in revolution speed between an engine speed of the engine and a revolution speed of the motor/generator becomes equal to or lower than a predetermined value during a start of the vehicle; and a controlling section that enables control of an optimum state of the clutch, driving states of the motor/generator and the engine, and gear speed range of the transmission, the method further comprising:

estimating a requested vehicular deceleration state on the basis of at least one of a vehicular running speed and a brake manipulated variable of a vehicular brake system;

calculating the engine speed of the engine, the revolution speed of the motor/generator, and a regenerative power obtained by the motor/generator under both of released and clutched states of the clutch for each gear speed range achievable by the transmission on the basis of the estimated requested vehicular deceleration state; and selecting one of the gear speed ranges of the transmission and an operation state of the clutch on the basis of the engine speed of the engine, the revolution speed of the motor/generator, and the regenerative power obtained by the motor/generator calculated in such a manner that as a charge state of the charge device becomes smaller, the regenerative power obtained by by the motor/generator becomes larger, wherein, at the controlling step, the operation state of the clutch, the driving states of the engine and motor/generator, and the gear speed range of the transmission are controlled on the basis of the gear speed range of the transmission and the clutched state of the clutch related to the selected driving state.

* * * * *